United States Patent
Aizpuru et al.

(10) Patent No.: US 10,324,298 B1
(45) Date of Patent: Jun. 18, 2019

(54) OFFSET IMAGE WEDGE WITH DUAL CAPABILITY AND ALIGNMENT TECHNIQUE

(71) Applicant: Optex Systems, Inc., Richardson, TX (US)

(72) Inventors: Jose Joaquin Aizpuru, Tehachapi, CA (US); Rodney Doster, Garland, TX (US); Danny Robert Schoening, Allen, TX (US)

(73) Assignee: OPEX SYSTEMS, INC., Richardson, TX (US)

( * ) Notice: Subject to any disclaimer, the term of this patent is extended or adjusted under 35 U.S.C. 154(b) by 0 days.

(21) Appl. No.: 16/035,374

(22) Filed: Jul. 13, 2018

(51) Int. Cl.
  *G02B 27/09* (2006.01)
  *G02B 7/18* (2006.01)

(52) U.S. Cl.
  CPC ........ *G02B 27/0905* (2013.01); *G02B 7/1805* (2013.01)

(58) Field of Classification Search
  CPC .......... G02B 5/04; G02B 7/1805; G02B 7/18; G02B 7/0905; F41G 1/545; F41G 1/54; F41G 1/38; F41G 1/44; F41G 1/387
  USPC ....... 359/429, 431, 831, 557, 511, 600, 601, 359/611; 42/130, 120, 129
  See application file for complete search history.

(56) References Cited

U.S. PATENT DOCUMENTS

| | | | | |
|---|---|---|---|---|
| 2,458,831 A * | 1/1949 | Cady | ...................... | G02B 23/10 356/252 |
| 3,378,687 A * | 4/1968 | Schepler | ................. | G01S 3/786 250/203.4 |
| 4,118,109 A * | 10/1978 | Crawford | ........... | G02B 26/0883 359/196.1 |
| 5,862,001 A * | 1/1999 | Sigler | ...................... | G02B 1/06 359/211.1 |
| 8,294,080 B2 * | 10/2012 | Rana | ...................... | G02B 23/02 250/216 |
| 8,363,321 B1 * | 1/2013 | Pochapsky | ............... | G02B 5/06 359/554 |
| 8,400,700 B2 * | 3/2013 | Adams | ................. | G02B 7/1805 359/209.1 |
| 8,749,887 B2 * | 6/2014 | Jahromi | .................... | F41G 1/38 359/399 |
| 9,164,269 B1 * | 10/2015 | Jahromi | .................... | F41G 1/38 |
| 9,644,920 B2 * | 5/2017 | Jahromi | .................... | F41G 1/38 |

(Continued)

*Primary Examiner* — John Cooper
(74) *Attorney, Agent, or Firm* — Sheppard Mullin Richter & Hampton LLP

(57) ABSTRACT

The present invention relates to an offset image wedge for use on a bore-sighted rifle that does not need to be exactly accurately mounted to the rifle because the offset image wedge is mounted directly onto the scope via a clamping mounting device and aligned optically by rotating the clamping mounting device on the scope until dual displayed images overlay each other. The offset image wedge allows for a dual image which allows it to be aligned in the field, and it allows for the user to choose either a bore-sighted image or an offset image without removing the wedge. This dual image capability is accomplished by having a wedge with a smaller diameter than the outer perimeter of the objective lens of the scope of the rifle. The use of a smaller diameter wedge allows the objective lens of the scope to continue to operate normally while the wedge delivers the offset image at the same time.

6 Claims, 9 Drawing Sheets

(56) References Cited

U.S. PATENT DOCUMENTS

2005/0039370 A1* 2/2005 Strong .................... F41G 1/473
                                                      42/130
2007/0236790 A1* 10/2007 Turienzo ................ G02B 23/12
                                                      359/399

* cited by examiner

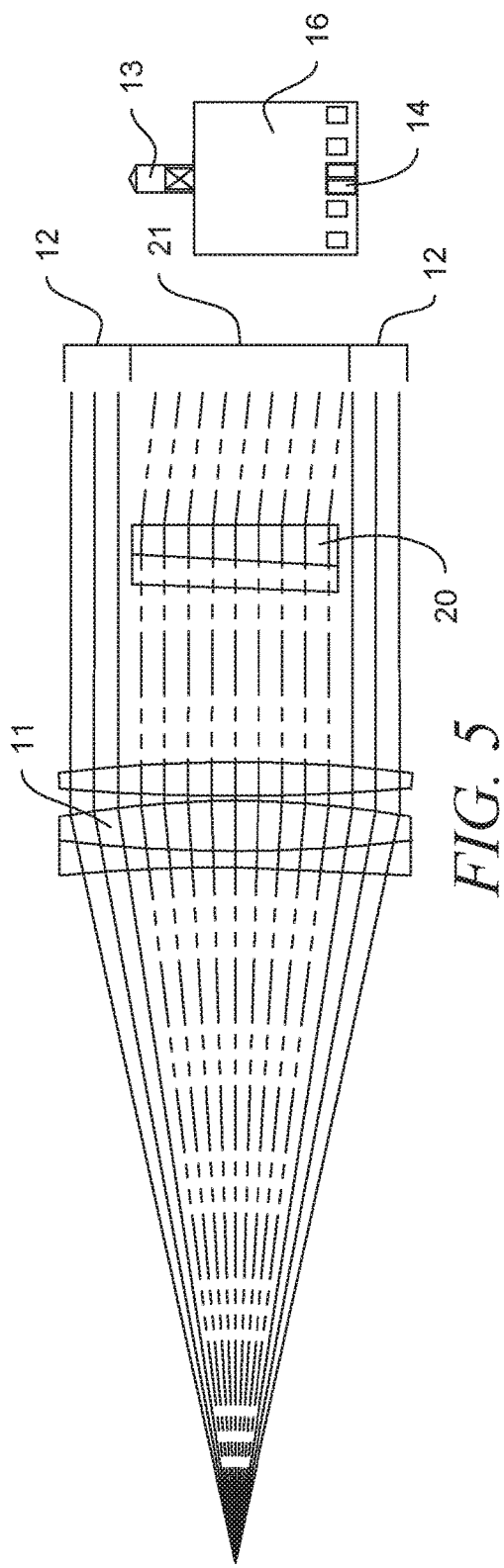
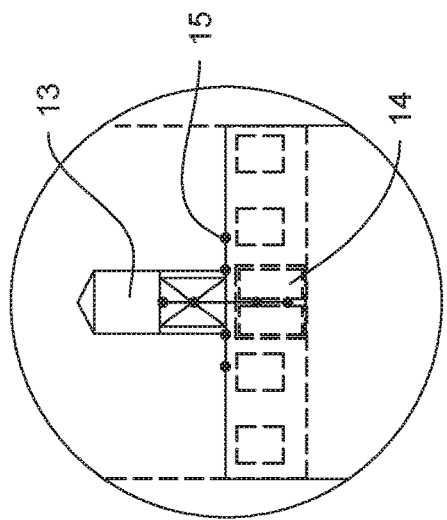
FIG. 5
FIG. 6

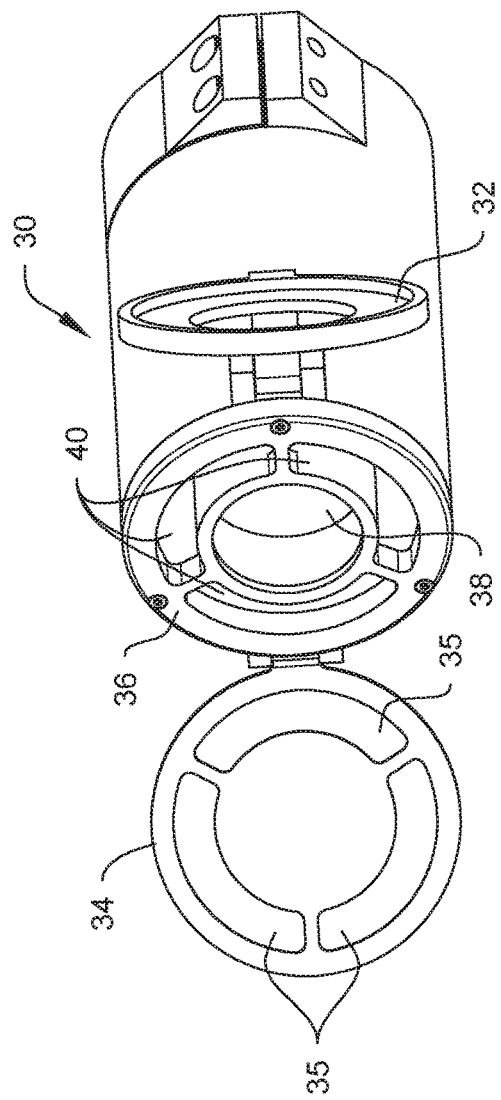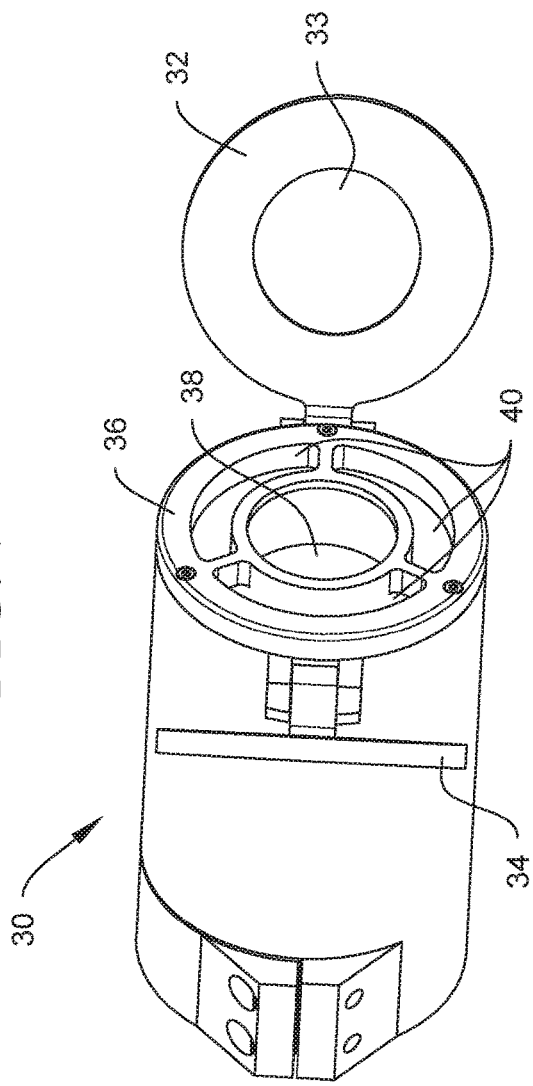
FIG. 7
FIG. 8

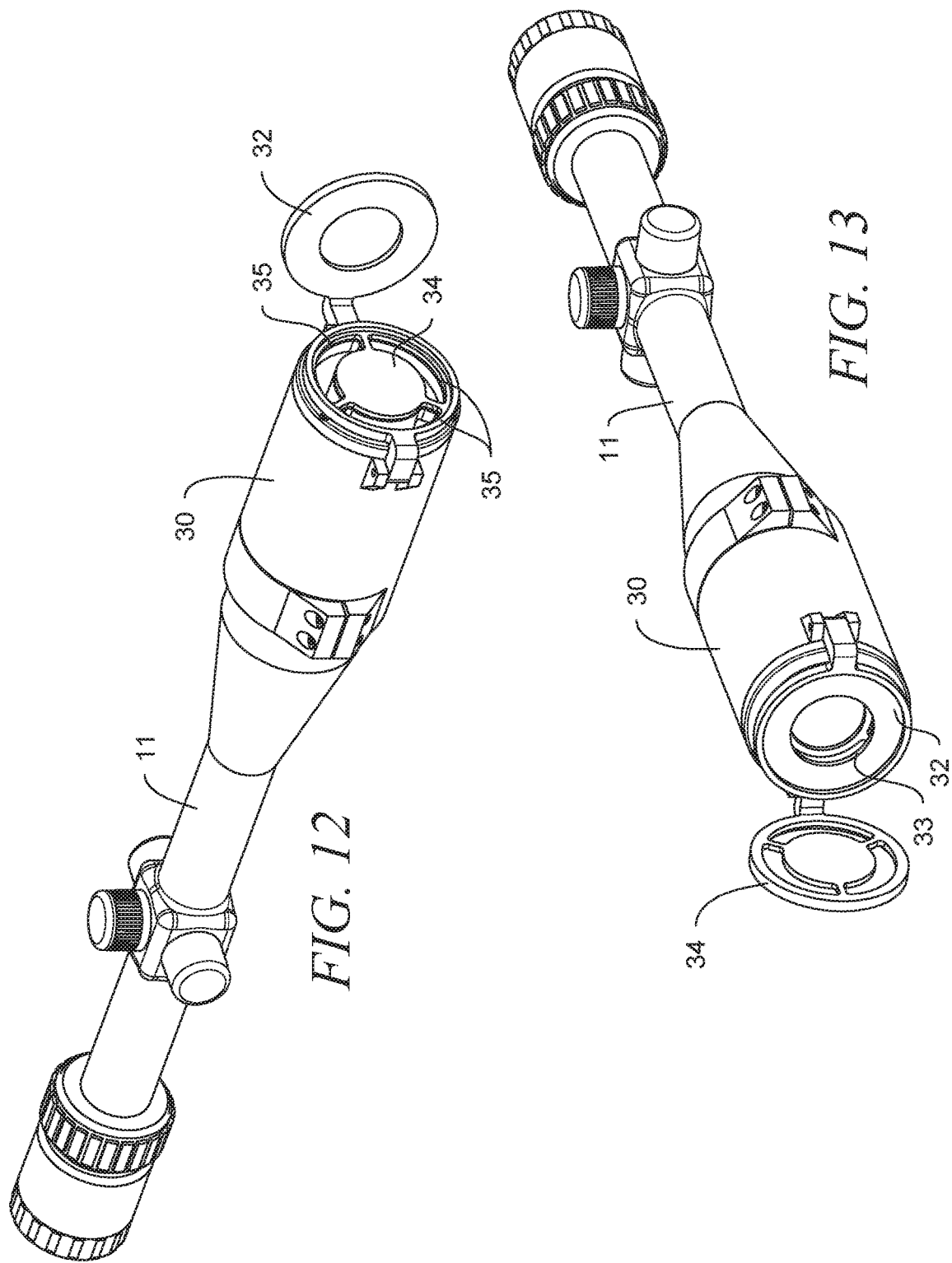

OFFSET IMAGE WEDGE WITH DUAL CAPABILITY AND ALIGNMENT TECHNIQUE

BACKGROUND OF THE INVENTION

1. Field of the Invention

This invention relates generally to an offset image wedge for use on a bore-sighted rifle. Specifically disclosed is an offset image wedge that does not need to be exactly accurately mounted to the rifle because the offset image wedge is mounted directly onto the scope via a clamping mounting device and aligned optically by rotating the clamping mounting device on the scope until dual displayed images overlay each other in the horizontal.

2. Description of Related Art

An optical scope mounted on a rifle is bore sighted, typically at a shooting range, to align a target set at a predetermined distance onto the reticle crosshairs. The image created by the scope at this distance is called the bore image. In some cases, as the distance grows longer and longer, the bore sighting exercise will result in the user needing to lower the front end of the scope to intentionally move the image within the scope higher to compensate for gravitational effects on the trajectory, in turn causing the user to elevate the barrel to realign the image on the scope reticle. At some point the distance for long range shooters becomes so large that the scope can no longer be moved lower enough to compensate for the increased gravitational effects on the trajectory. At that point, a secondary optical element, such as a wedge, is needed to create a secondary image which will view something at said long distance but will be imaging something out of the field of view of the original scope. This secondary image will be referred to as the offset image.

Aligning both the wedge element and the scope to the barrel requires great precision and is very difficult to accomplish as each is mounted to the rifle independently, typically on the rifle's Picatinny rail, and each contributes a certain amount of error. If the wedge is not mounted plumb to the rail of the scope, targeting errors become quite large when shooting relatively small targets at long distances. Alignment for a conventional, prior art wedge implementation requires a highly accurate bonding of the wedge element onto its retainer which is then mounted to the Picatinny rail. The individual scope and wedge errors relative to the Picatinny rail mount would be set and the user would not be able to change the error contributed to the system with the wedge or directly verify its stability. For example, one degree of tilt (roll) on a 60 MOA wedge produces 1 MOA windage error, and this built-in error is unchangeable with known prior art mounting systems.

It is therefore desirable to have the ability for a user to add a wedge to a bore-sighted rifle that requires less mounting precision, but still affords great targeting accuracy.

SUMMARY OF THE INVENTION

The present invention provides for an offset image wedge for use on a bore-sighted rifle that does not need to be exactly accurately mounted to the rifle. The offset image wedge allows for a dual image which allows it to be aligned in the field, and it allows for the user to choose either a bore-sighted image or an offset image without removing the wedge. This dual image capability is accomplished by having a wedge with a smaller diameter than the outer perimeter of the objective lens of the scope of the rifle. The use of a smaller diameter wedge allows the objective lens of the scope to continue to operate normally while the wedge delivers the offset image at the same time. Because the wedge has a smaller diameter, the bore-sighted image can enter the objective lens of the scope through the outer perimeter of the scope by traveling unimpeded by the wedge. Additionally, the offset image created by the wedge enters the objective lens of the scope in the center and is coaxial with the scope.

This dual image capability of the present invention allows the user to both align the wedge in an accurate manner in the field and to select which of the dual images he wishes to view. The selection of images is accomplished through different masks that are attached to the wedge housing that attaches to the scope and houses the wedge. Because the outer periphery of the lens objective of the scope collects the ray bundles of the bore-sighted image and the center circular section corresponding to the size of the wedge collects the offset image, if either of these two areas is masked, then the view of the non-masked area is visible to the user. The masks and the dual image used with this invention allows the user to "turn on and off" one of the different views and to use whichever view he desires without removing the wedge.

To accurately align the wedge in the field, the wedge housing is placed onto the scope with both image masks in their open position to create the dual image. The user then aligns the crosshairs vertically on a vertical edge of the bore-sighted image, and rotates the wedge housing until the same vertical edge of the offset image is aligned vertically with the bore-sighted image. Once the images are aligned vertically, the user can lock the wedge housing into place on the scope.

The novel features and construction of the present invention, as well as additional objects thereof, will be understood more fully from the following description when read in connection with the accompanying drawings.

BRIEF DESCRIPTION OF THE DRAWINGS

The improved process of the invention is further described and explained in relation to the following figures of the drawings wherein:

FIG. 5 depicts the dual ray image bundle showing the same exemplar building passing through both the offset image wedge and the prior art scope.

FIG. 6 is an exemplar view of the dual image of the same building as seen through both the offset image wedge and the prior art scope.

FIG. 7 is a perspective view of the offset image wedge of the present invention.

FIG. 8 is a perspective view of the offset image wedge of the present invention.

FIG. 12 is a perspective view of the offset image wedge of the present invention mounted to the prior art scope.

FIG. 13 is a perspective view of the offset image wedge of the present invention mounted to the prior art scope.

Like reference numerals are used to describe like parts in all figures of the drawings.

DESCRIPTION OF THE PREFERRED EMBODIMENTS

Figure 1:
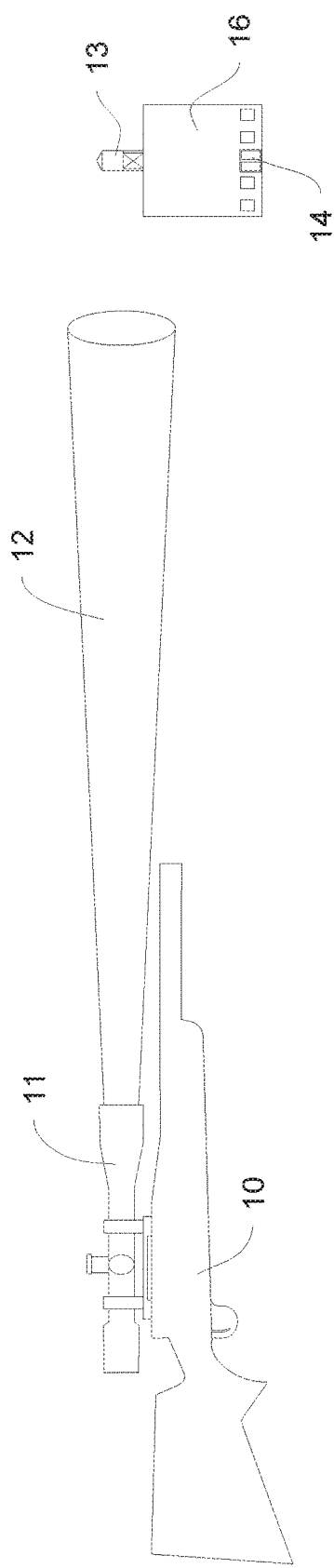
FIG. 1 is an exemplar view of a prior art scope and its line of sight mounted on a prior art rifle along with an exemplar building in the distance.
Figure 2:
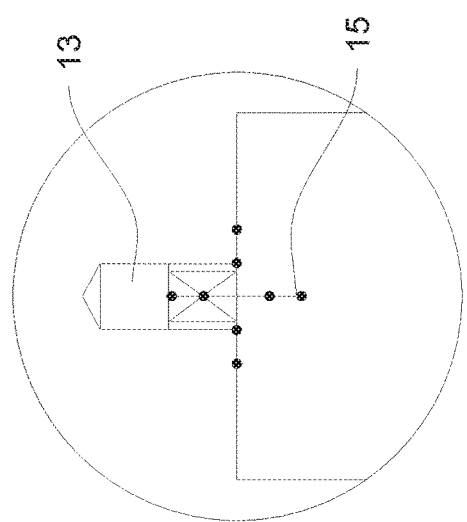
FIG. 2 is an exemplar view of the image of the building visible inside the prior art scope of FIG. 1.

Referring to FIG. 1, a typical configuration of prior art rifle 10 with prior art scope 11 mounted thereto is shown. In this example, scope 11 is viewing a target at a distance, which is building 16 with front doors 14 and water tower 13 on top. Scope 11 is coaxially aligned with viewing cone 12, which represents the field of view and is known as a bore-sighted image. FIG. 2 depicts what a viewer would see if observing through the eyepiece of scope 11 as aimed in FIG. 1. Reticle crosshairs 15, which stay stationary within viewing window of scope 11, are used by the viewer to aim rifle 10 at a target. In FIG. 2, reticle crosshairs 15 are overlaid on top of the image of building 16, and aligned at the base of water tower 13 to top of building 16. If rifle 10 is moved slightly, crosshairs 15 will stay in the center of the viewing circle as they are located within the confines of scope 11 while the image of building 16 will move in and out of viewing cone 12 of scope 11, depending on the amount of movement of rifle 10.

Figure 3:
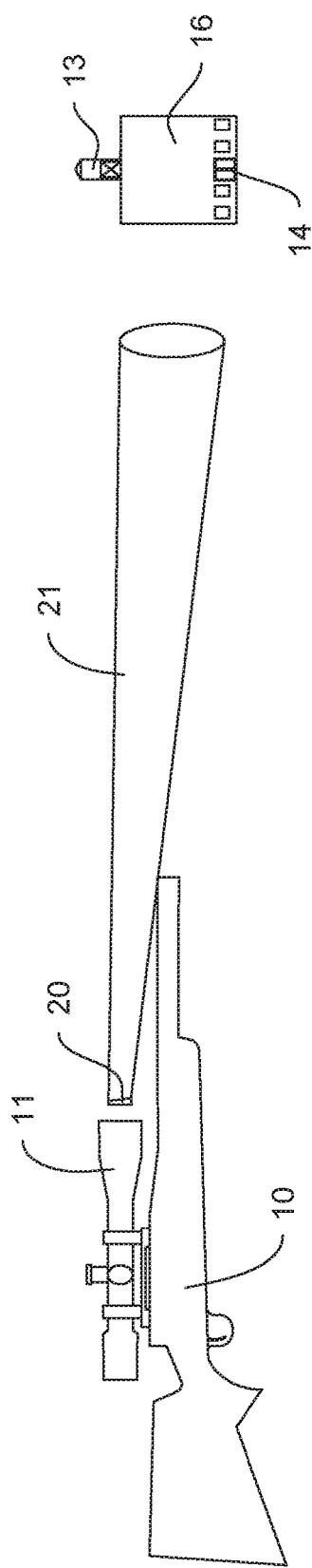
FIG. 3 is an exemplar view of the effect of placing an offset image wedge in front of the prior art scope of FIG. 1 viewing the same exemplar building.
Figure 4:
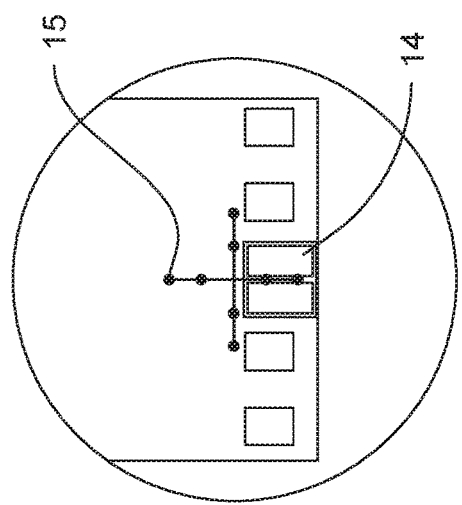
FIG. 4 is an exemplar view of the image of the same building visible inside the prior art scope with the offset image placed in front of the scope as shown in FIG. 3.

Referring to FIG. 3, wedge 20, which has non-parallel side surfaces, redirects light such that the incident and exit angles of the viewed image are not the same. In FIG. 3, wedge 20 is located in front of scope 11, and the field of view represented by viewing cone 21 is offset and lower than coaxial viewing cone 12 as shown in FIG. 1. The non-parallel side surfaces of wedge 20 cause the field of view that enters scope 11 to be offset (lower here in FIG. 3) than the field of view without wedge 20 as in FIG. 1. The effect of the placement of wedge 20 in front of scope 11 is shown in FIG. 4. Wedge 20 is placed and adjusted such that the offset image created is directly below the previous bore-sighted image. As can be seen, crosshairs 15 are now centered just above front doors 14 of building 16 in the field of view. Depending on the rotational orientation of wedge 20, the offset image can be located either above, below, right or left of the bore-sighted image, and as wedge 20 is rotated, viewing cone 21 moves radially along with it as it rotates around coaxial viewing cone 12. If wedge 20 is rotated one full time, then viewing cone 21 also moves a full circle around coaxial viewing cone 12, which creates a dynamic offset image as wedge 20 is rotated.

For the present invention to work as intended, it is critical that wedge 20 have a smaller diameter than the outer perimeter of the objective lens of scope 11. This is counter to conventional thinking that would dictate placing a wedge of the same or larger diameter compared to the objective lens of scope 11 so as to not affect the entrance pupil at the objective lens. However, the use of a smaller wedge allows the objective lens of scope 11 to continue to operate normally while the wedge delivers the offset image at the same time. This dual-image operability is shown in FIG. 5, which illustrates with solid lines the bore-sighted image traveling unimpeded by wedge 20 into the objective on the outer perimeter of scope 11, while the offset image created by wedge 20 and depicted in dashed lines is redirected to being coaxial to scope 11. The effect of using smaller diameter wedge 20 is shown in FIG. 6, and it is critical for the operation of the invention that the two resulting images are overlaid. The view represented by FIG. 6 is a combination of the view in FIG. 2 of the bore-sighted image and the view in FIG. 4 of the offset image. In FIG. 6 the solid lines represent the bore-sighted image, which was of the base of water town 13 on building 16, and the dashed lines represent the offset image, which is of the top of front doors 14 of building 16. Reticular crosshairs 15 remain unchanged relative to both images as it is located within scope 11 and unaffected by wedge 20. The dual image is only used to align wedge 20, which will be discussed below, and the user would never shoot with the dual image showing in scope 11.

As discussed above regarding FIG. 5, the lens objective of scope 11 coaxially collects two separate ray bundles, which become the dual images. The outer periphery of the lens objective of scope 11 collects the ray bundles of the bore-sighted image and the center circular section corresponding to the size of wedge 20 collects the offset image. If the area of the lens objective of scope 11 corresponding to one of the image ray bundles is masked to exclude that ray bundle, the dual image returns to a single image corresponding to the unmasked ray bundle, as will be discussed below. The dual image used with this invention allows the user to "turn on and off" one of the different views and to use whichever view he desires without removing the wedge.

Referring to FIGS. 7 through 13, the preferred embodiment of wedge housing 30 is shown. Wedge housing 30 is generally cylindrical in shape with one end aligned with and mounted to scope 11 and the other end housing wedge 20 and comprising two masks 32 and 34. Wedge housing 30 has a diameter approximately equal to the diameter of scope 11. After wedge housing 30 is aligned and securely mounted to scope 11, the user can utilize either of the two masks 32 and 34 to switch between image views, observing the dual image for alignment purposes, and turning off both images when not in use.

Spider 36 is comprised of a center circle and three thin legs affixed to the center circle. The center circle defines center viewing window 38 corresponding generally to the size of wedge 20, and the three thin legs define three outside viewing windows 40 that circle the perimeter and generally fill the remainder of the diameter of wedge housing 30. Spider 36 is permanently affixed to the end of wedge housing 30. Mask 34 is mounted to end of wedge housing 30 via a hinged mechanism, which allows mask 34 to be closed—where it is adjacent to spider 36, or open—where it is rotated away from spider 36.

Offset image mask 34 has three viewing windows 35 that correspond to viewing windows 40 of spider 36 and a solid center section that aligns with center viewing window 38, when offset image mask 34 is closed (i.e., adjacent to spider 36). As shown in FIG. 12, when offset image mask 34 is closed, only the ray bundle corresponding to the bore-sighted image enters wedge housing 30, and the offset image ray bundle does not enter wedge 20 because viewing window 38 is masked.

Bore-sighted image mask 32 has one center window 33 that corresponds to center viewing window 38 in spider 36 when bore-sighted mask 32 is closed in an adjacent position to spider 36. The remainder of mask 32 is solid. As shown in FIG. 13, when bore-sighted image mask 32 is closed, only the ray bundle corresponding to the offset image enters wedge housing 30, and the bore-sighted image ray bundle does not enter scope 11 (via wedge housing 30) because viewing windows 40 in spider 36 are masked.

Figure 9:
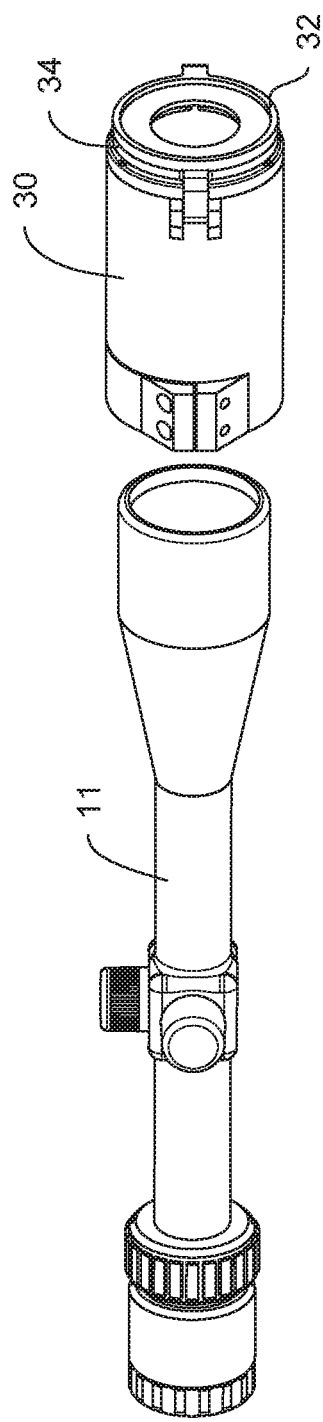
FIG. 9 is a perspective view of the offset image wedge of the present invention and the prior art scope.
Figure 10:
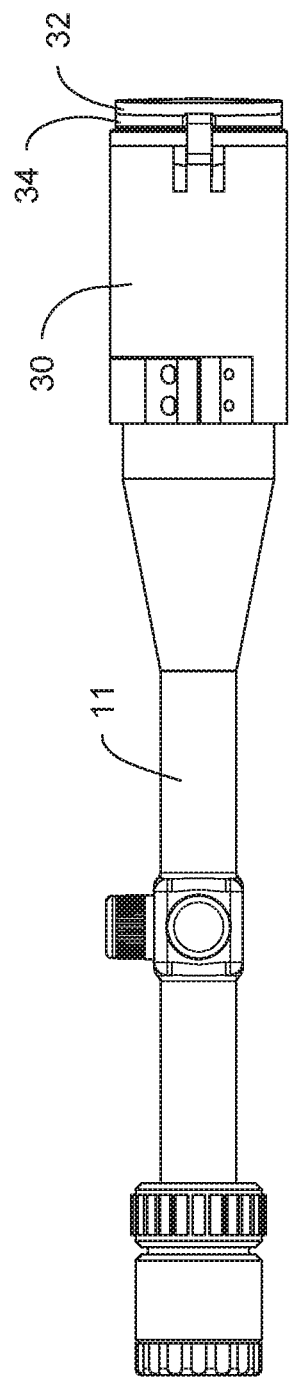
FIG. 10 is a perspective view of the offset image wedge of the present invention mounted to the prior art scope.
Figure 11:
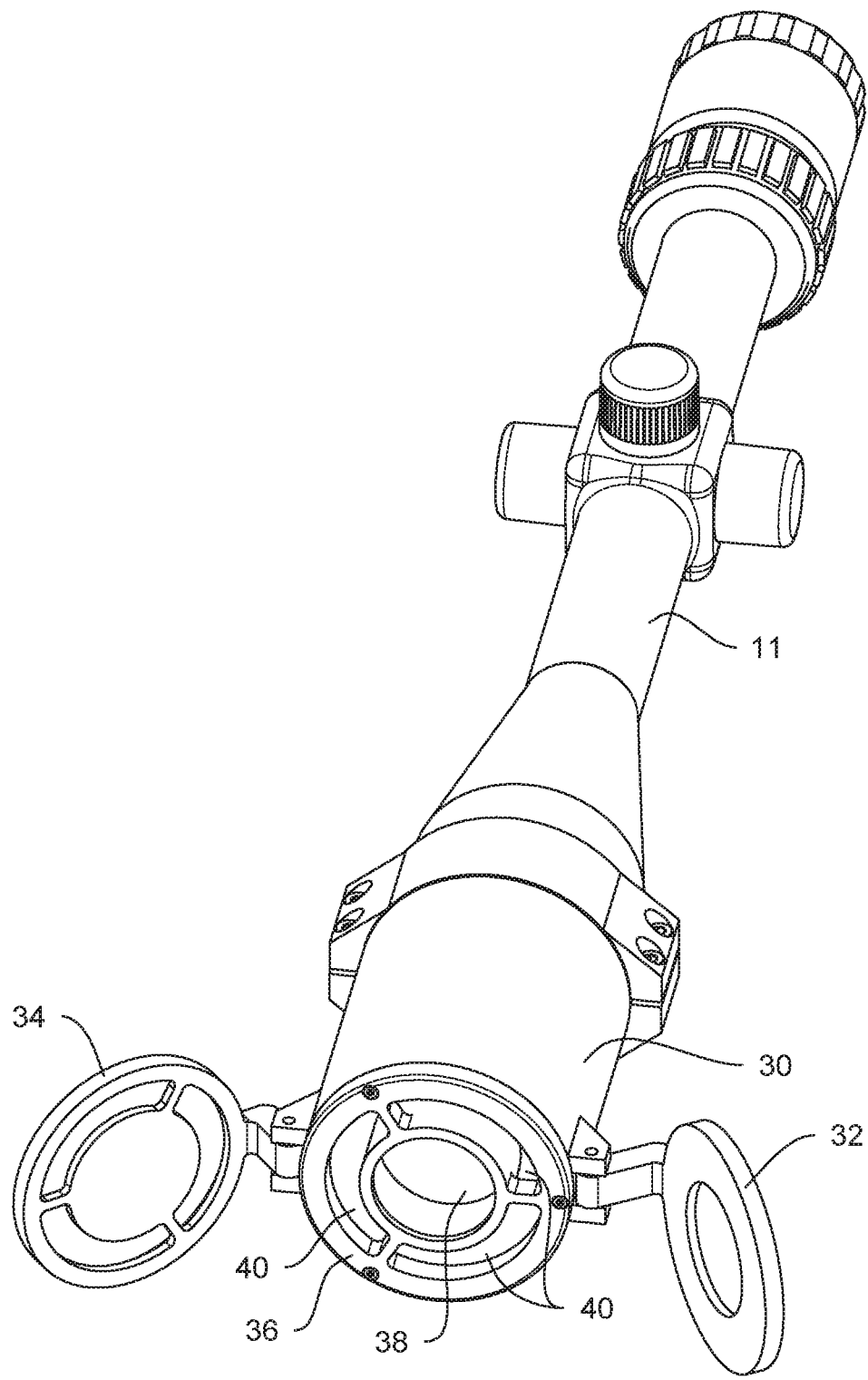
FIG. 11 is a perspective view of the offset image wedge of the present invention mounted to the prior art scope.

FIGS. 9 and 10 show the preferred embodiment of wedge housing 30 wherein it is unattached to scope 11 in FIG. 9 and affixed to scope 11 by means of a clamp in FIG. 10. Since both masks 32 and 34 are closed, this depicts that scope 11 is not in use and no image is delivered to the user. FIG. 12 illustrates bore-sighted image selection as offset image mask 34 is in place and light enters only through the outer perimeter of the system, avoiding the wedge element. FIG. 13 illustrates offset image selection as bore-sighted image mask 32 is in place and light enters only through the center portion of the system, through the wedge element. FIG. 11 illustrates dual image selection as neither mask 32 or 34 is in its closed position allowing both the bore-sighted image and offset image to be delivered to the scope.

Due to the nature of the present invention, wedge 20 can now be mounted within only several degrees of accuracy instead of the fixed, yet unknown accuracy of approximately one degree as is required in the prior art wedge installations. The present invention does not require highly accurate mounting of the bonded wedge to the retainer relative to the Picatinny adapter with regard to plumb. Instead, the user slides wedge housing 30 onto the outer diameter of scope 11 and can adjust the system as follows.

Figure 15:
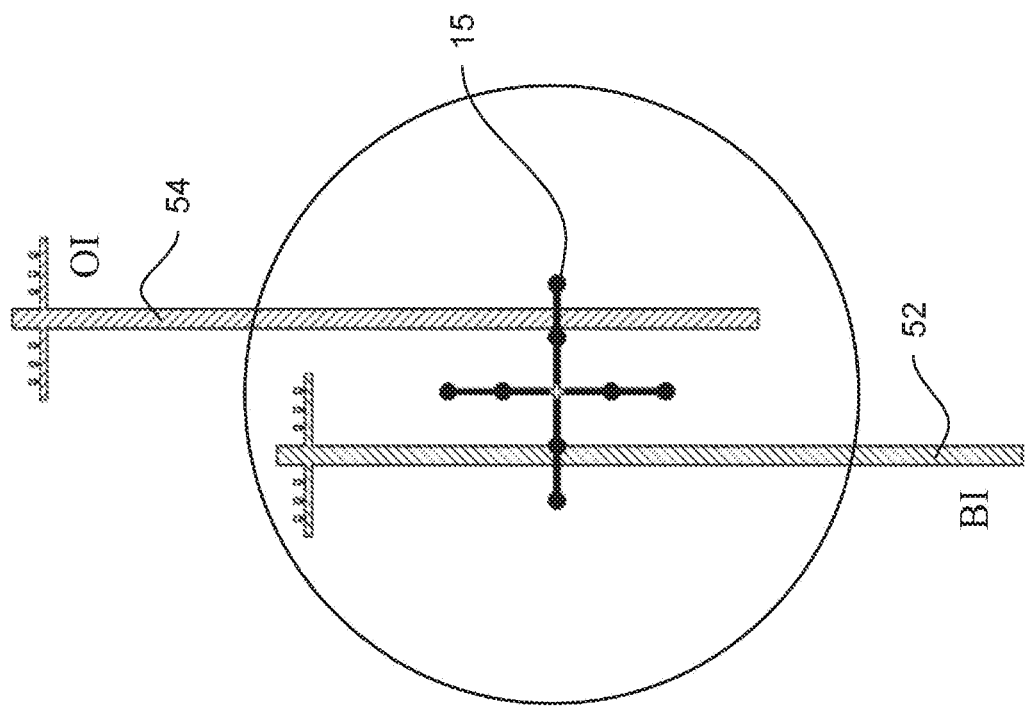
FIG. 15 is an exemplar view of the dual image of the power pole as seen through both the offset image wedge of the present invention and the prior art scope.
Figure 14:
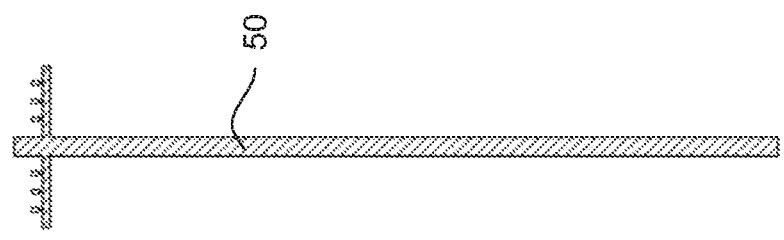
FIG. 14 is an exemplar view of a vertical object (power pole).
Figure 17:
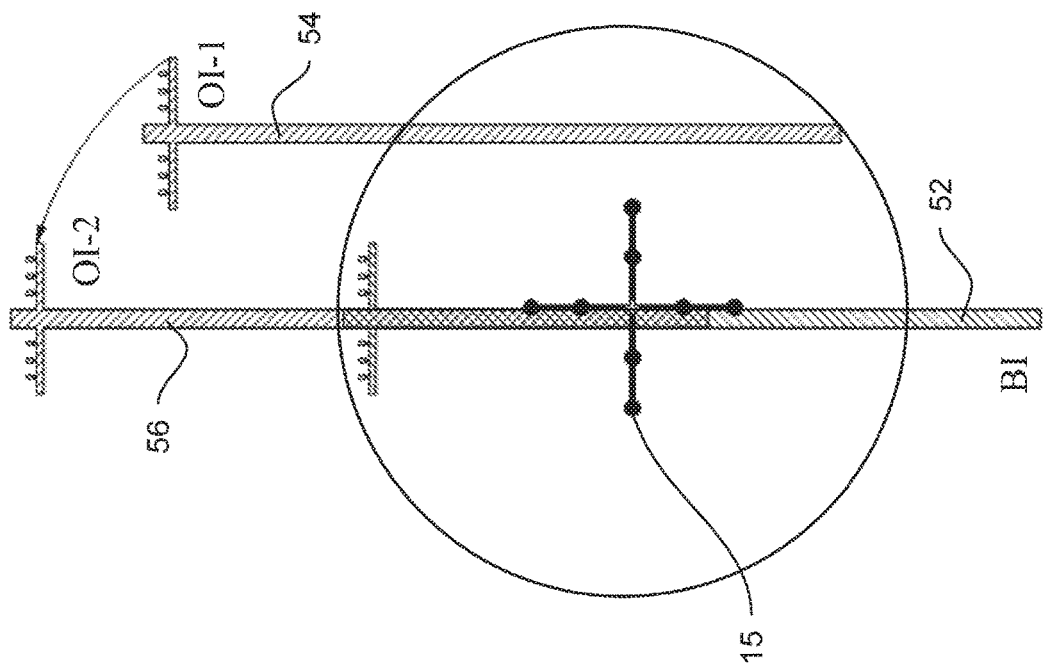
FIG. 17 is an exemplar view of the dual image of the same power pole as seen through both the offset image wedge of the present invention and the prior art scope.
Figure 16:
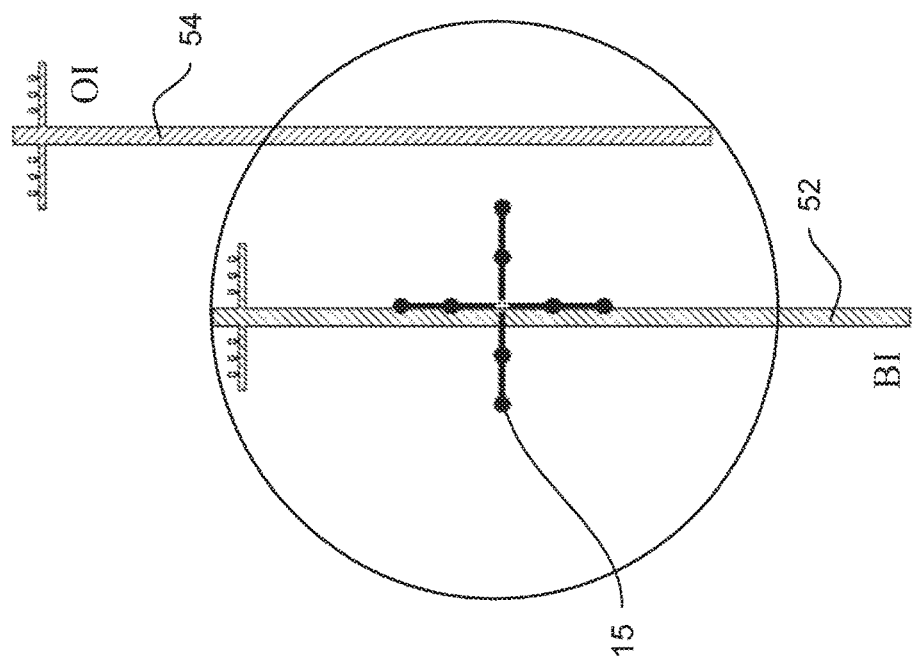
FIG. 16 is an exemplar view of the dual image of the same power pole as seen through both the offset image wedge of the present invention and the prior art scope.

Referring to FIGS. 14-17, the process of accurately aligning wedge 20 when mounted to scope 11 is shown. FIG. 14 shows power pole 50 in the distance as viewed by the naked eye. In FIGS. 15-17, the field of view of scope 11 is indicated by the circles shown. To best illustrate the example, portions of the image that would not actually fit inside the field of view are shown extended beyond the scope field of view.

To accurately align wedge 20, wedge housing 30 is placed onto scope 11 and both image masks 32 and 34 are in their open position as shown in FIG. 11, which creates the dual image. The user then aims rifle 10 such that power pole 50 is in plain view within scope 11. Because both image masks 32 and 34 are open as shown in FIG. 11, two power poles appear in the view: bore-sighted image power pole 52 and offset image power pole 54 as shown in FIG. 15. At this point, there has been no alignment, which is why the two power poles 52 and 54 are not vertically aligned with each other and reticular crosshairs 15 are not aligned on any portion of either pole.

As shown in FIG. 16, to align wedge 20, the user must move scope 11 such that reticular crosshairs 15 line up with the bore-sighted image of power pole 52. Reticular crosshairs 15 are aligned such that any long vertical feature within the image is in line with the vertical line of crosshairs 15. In this specific example, the vertical feature used is the right edge of power pole 52. As shown, the offset image of power pole 54 moves further away from the center of scope field of view since aligning to the vertical edge of the bore-sighted image of power pole 52 necessitated a move in the opposite direction.

Next, the user rotates wedge housing 30, which also rotates wedge 20 affixed therein. As shown in FIG. 17, this rotation causes the offset image to rotate within the field of view. Offset image 1 as represented by power pole 54 moves counter-clockwise toward the position offset image 2 as represented by power pole 56. Once the offset image is vertically aligned with the bore-sighted image (here, when both power poles are aligned with each other vertically), the user has accurately aligned wedge housing 30 and can lock it into place on scope 11. The user can then choose which of the three views he wishes to view in scope 11 and close or open masks 32 and 34 appropriately. The three views available to the user are: 1) bore-sighted image with bore-sighted image mask 32 open and offset image mask 34 closed; 2) offset image with offset image mask 34 open and bore-sighted image mask 32 closed; or 3) dual image view with both masks 32 and 34 open. Additionally, the user can close masks 32 and 34 when the scope is not in use.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The invention claimed is:

1. An offset image wedge for use with a bore-sighted scope with a circular lens comprising:
   a housing with a rear-facing end that is attachable to the bore-sighted scope and a forward-facing end with a circular wedge mounted therein that is coaxially-aligned with and has a smaller diameter than the lens of the bore-sighted scope;
   and two image masks;
   wherein the scope receives a dual image because the outer periphery of the lens of the bore-sighted scope collects a ray bundle unimpeded by the wedge and the center circular section of the lens of the bore-sighted scope corresponding to the diameter of the wedge collects an offset ray bundle that has passed through the wedge;
   wherein the wedge is rotatable to allow the image produced by offset ray bundle to be aligned vertically with the image produced by the unimpeded ray bundle; and
   further wherein one or both of the dual images can be masked from the lens of the bore-sighted scope through the use of one or both of the image masks.

2. The offset image wedge of claim 1 wherein the housing is generally cylindrical in shape with a diameter approximately equal to the diameter of the bore-sighted scope.

3. The offset image wedge of claim 1 wherein the two image masks are attached to the forward-facing end of the housing.

4. The offset image wedge of claim 1 wherein the two image masks are independently hinged allowing each to be in a masking position or a non-masking position independent of the other mask's position.

5. The offset image wedge of claim 1 wherein the housing is removably clamped to the bore-sighted scope.

6. A method of dual image capture to allow an offset image wedge to be vertically aligned with a lens of a bore-sighted scope, the steps comprising:
   attaching a housing to the bore-sighted scope, the housing comprising a forward-facing end with a circular wedge mounted therein that is coaxially-aligned with and has a smaller diameter than the lens of the bore-sighted scope;

collecting an unimpeded ray image bundle from the outer periphery of the lens of the bore-sighted scope that is unimpeded by the wedge;

collecting an offset ray bundle from the center circular section of the lens of the bore-sighted scope that has passed through the wedge; and rotating the wedge until an image produced by the offset ray bundle is aligned vertically with an image produced by the unimpeded ray bundle.

* * * * *